United States Patent [19]
Lenhart et al.

[11] Patent Number: 5,624,576
[45] Date of Patent: Apr. 29, 1997

[54] PELLETIZED COMPOSITION FOR TREATMENT OF STORM WATER RUNOFF

[75] Inventors: James H. Lenhart, Aloha; John H. Knutson, Hillsboro; William C. Stewart, Gladstone; David C. Campbell, Molalla, all of Oreg.

[73] Assignee: CSF Treatment Systems, Inc., Beaverton, Oreg.

[21] Appl. No.: 598,232

[22] Filed: Feb. 7, 1996

Related U.S. Application Data

[63] Continuation-in-part of Ser. No. 452,504, May 30, 1995, abandoned.

[51] Int. Cl.$^6$ ............................................. B01D 37/00
[52] U.S. Cl. ....................... 210/767; 210/807; 210/500.1; 210/770; 428/400; 502/400
[58] Field of Search ............................ 210/767, 170, 210/263, 289, 291, 455, 456, 615, 619, 730, 602, 603, 617, 608, 770, 500.1, 807; 502/401, 400

[56] References Cited

U.S. PATENT DOCUMENTS

| | | |
|---|---|---|
| 968,983 | 8/1910 | Riedy . |
| 3,674,687 | 7/1972 | Quase ............................ 210/170 |
| 3,889,884 | 6/1975 | Morse ............................ 241/24 |
| 4,135,908 | 1/1979 | Widmer ............................ 71/9 |
| 4,829,045 | 5/1989 | Fransham ....................... 502/401 |
| 4,959,084 | 9/1990 | Wolverton et al. . |
| 4,972,855 | 11/1990 | Kuriyama et al. ................. 131/355 |
| 4,976,873 | 12/1990 | Ross ............................ 210/264 |
| 5,084,163 | 1/1992 | Baumann et al. . |
| 5,133,619 | 7/1992 | Murfae et al. .................... 404/4 |
| 5,232,587 | 8/1993 | Hegemier et al. . |
| 5,296,293 | 3/1994 | Jobst ............................ 428/403 |
| 5,322,629 | 6/1994 | Stewart ......................... 210/767 |

FOREIGN PATENT DOCUMENTS

| | | |
|---|---|---|
| 054684 | 1/1975 | Japan ........................... 210/730 |

OTHER PUBLICATIONS

Bohn, H.L., "Soil and Compost Filters of Malodorant Gases," *APCA Note–Book* 25(9):953–955, 1975.

Bohn H.L., "Compost Scrubbers of Malodorous Air Streams", *Compost Sci.* (Winter):15–17, 1976.

Rands, M.B., "Compost filters of $H_2S$ removal from anaerobic digestion and rendering exhausts," *Journal WPCF* 53(2):185–189, 1981.

Pomeroy, R.D., "Biological treatment of odorous air," *Journal WPCF* 54(12):1541–1545, 1982.

Leson, G. et al, "Biofiltration: An Innovative Air Pollution Control Technology for VOC Emissions," *J. Air Waste Manage. Assoc.* 41(8):1045–1054, 1991.

Kirkham, M.B., "Organic Matter and Heavy Metal Uptake," *Compost Sci.* (Jan.–Feb.):18–21, 1977.

Sposito, G., "Sorption of Trace Metals by Humic Materials in Soils and Natural Waters," *CRC Critical Reviews in Environmental Control* 16:193–229, 1986.

(List continued on next page.)

*Primary Examiner*—Ana Fortuna
*Attorney, Agent, or Firm*—Christensen O'Connor Johnson & Kindness

[57] ABSTRACT

A pelletized composition and method of using this composition for removing pollutants from storm water runoff. A bed of the pellets has a useful initial permeability to storm water runoff, and retains a significant proportion of this permeability for a period of several years. Preferably, the pellets are dried to a moisture content of less than 25 wt. % so that they are able to withstand a crush force of at least 7 lb., without structural failure. Optionally, the pellets may contain gravel that forms a core of the compost pellet and that assists in causing the compost to agglomerate into a rounded pellet. When immersed in water, the pellets retain the original dry shape and maintain a significant proportion of the crush strength while providing interstitial spaces through which storm water can flow thereby reducing the problem of sedimentation that is encountered in unpelletized beds of compost used in this service.

21 Claims, 4 Drawing Sheets

OTHER PUBLICATIONS

Chiou, C.T., "Theoretical Considerations of the Partition Uptake of Nonionic Organic Compounds by Soil Organic Matter," *Soil Science Society of America and American Society of Agronomy*, Madison, WI, SSSA Special Publication 22:1–29, 1989.

Pignatello, J.J., "Sorption Dynamics of Organic Compounds in Soils and Sediments," *Soil Science Society of America and American Society of Agronomy*, Madison, WI, SSSA Special Publication 22:45–80, 1989.

Senesi, N. et al., "Interactions of Toxic Organic Chemicals with Humic Substances," in *Toxic Organic Chemicals in Porous Media*, Z. Gerstl et al. (eds.), Springer–Verlag, New York, New York, 37–90., 1989.

DeBoodt, M.F., "Application of the Sorption Theory to Eliminate Heavy Metals From Waste Waters and Contaminated Soils," in *Interactions at the Soil Colloid–Soil Solution Interface*, G.H. Bolt et al. (eds.), Kluwer Academic Publishers, Boston, Massachusetts, 293–299, 1991.

Bell, J.P. et al., "Removal of hazardous organic pollutants by biomass adsorption," *Journal WPCF* 59:191–198, 1987.

Bell, J.P. et al., "Removal of Hazardous Organic Pollutants by Adsorption on Microbial Biomass," *Wat. Sci. Tech.* 19:409–416, 1987.

Tsezos, M. et al., "Significance of Biosorption for the Hazardous Organics Removal Efficiency of a Biological Reactor," *Wat. Res.* 22:391–394, 1988.

Tsezos, M. et al., "Comparison of the Biosorption and Desorption of Hazardous Organic Pollutants by Live and Dead Biomass," *Wat. Res.* 23:561–568, 1989.

Final Report, "Compost Storm Water Treatment System," W&H Pacific, Portland, Oregon, Mar. 2, 1992.

5,624,576

1

PELLETIZED COMPOSITION FOR TREATMENT OF STORM WATER RUNOFF

STATEMENT OF RELATED APPLICATIONS

This application is a continuation-in-part of U.S. Ser. No. 08/452,504 filed on May 30, 1995, now abandoned.

FIELD OF THE INVENTION

The invention relates to the treatment of storm water runoff to remove pollutants from the runoff prior to discharge into a water-receiving system. More particularly, the invention relates to treatment of the storm water runoff by passing the runoff through a bed of pelletized mature deciduous leaf compost that removes pollutants from the runoff.

BACKGROUND OF THE INVENTION

Storm water runoff is a form of diffuse or non-point source pollution. It is caused by rain washing pollutants, such as particulate matter, organic matter, heavy metals, and organic toxins into receiving natural bodies of water. As a consequence, natural bodies of water that receive storm water also receive pollutants that have harmful environmental effects. The amount of pollution entering into such receiving bodies of water is related to the degree of urbanization in the surrounding area and the nature of the urbanization. Urbanization results in the paving of land with water-impermeable materials, such as concrete, upon which pollutants tend to accumulate over time. Rain falling upon this type of surface washes the pollutants into the storm water runoff system and thence into the receiving water body.

Several hundred years ago storm water runoff was not a significant problem. Rain fell on earth rich in organic matter formed by the accumulation of decayed vegetation. This organic matter absorbed and filtered the water before it made its way into the groundwater, streams and rivers. In addition, the undisturbed soils lost little particulate matter due to erosion, and there was insignificant, if any, amounts of oil and grease, heavy metals or organic toxins to be carried into the receiving wetlands, streams and rivers.

Now, however, due to increasing urbanization, storm water runoff has been identified as a significant source of pollution in receiving water bodies. Storm water differs from waste water in many ways. Unlike wastewater, which flows more or less continuously year around, storm water is intermittent, and usually shows seasonal peaks. Pollutant concentrations in storm water, in addition to being highly dependent on localized factors, are also correlated with rainfall interval spacing. In other words, the longer the period between storms, the greater the potential for high pollutant concentration(s) when a rainfall event occurs. This is due to the continual accretion of pollutants on surfaces between rainfall episodes. Thus, potential damage to receiving water ecosystems is often greatest after a prolonged dry spell, such as occurs during summer periods over much of the west coast of the United States, when the first storms of the fall season wash particularly concentrated accumulations of toxic materials off roadways and other surfaces. These first flush events occur when receiving streams are at low flow and dilution of the pollutants from the storm water is limited. The degree of pollution of the receiving water body is heavily rainfall intensity dependent. Therefore the heaviest pollutant loading at the end of a dry spell may not occur during the first storms, if these storms are not of sufficient strength to flush pollutants off the rainfall receiving surfaces.

2

Within a particular storm event, there is also what is known as the "first flush" phenomenon. Generally, the first flush occurs during the first half-hour or so, when the rain is flushing the amassed buildup of pollutants that has accumulated during the interval since the preceding storm, and pollution loadings are highest. Even if the storm lasts several hours or more, contamination levels during the remainder of the storm are usually low or even undetectable.

In an effort to address the pollution problems posed by storm water runoff, U.S. Pat. No. 5,322,629 proposes a method and apparatus for treating storm water. In accordance with the invention of the '629 patent, storm water is passed through a bed of high quality leaf compost material that removes pollutants from the runoff prior to its discharge into a water-receiving system. The patent also illustrates and describes embodiments of an apparatus that facilitates the treatment of the water through the bed of compost. The '629 patent recognizes that the compost may compact over time so that the flow of storm water through each square foot of the bed is reduced. This flow rate through the bed, referred to as its "permeability" in the '629 patent but more correctly termed its "infiltration capacity," is an important parameter. If the infiltration capacity of the bed, i.e., the flow rate in gallons per minute through a square foot of the bend, is low, then a large bed is needed to treat a specified rate of water runoff On the other hand, if the infiltration capacity is high, then a smaller bed may be used but there may be insufficient contact time between the water and the compost for removal of pollutants. Moreover, storm water carries with it sediment, such as sand and other particulates, that can cause gradual clogging up of flow channels in a compost bed so that infiltration capacity is reduced.

In order to enhance long-term infiltration capacity, the '629 patent teaches that at least about 15% by dry weight (of the compost) of gravel or crushed rock should be added to and mixed with the compost to form a bed. Nevertheless, despite such gravel addition, it has been found that over a period of time the infiltration capacity of the compost bed decreases so that the bed must ultimately be replaced. Replacement generally requires some manual labor, and is relatively expensive especially since the operation does not generate revenue for the municipality maintaining the sewer. Municipalities would prefer a storm water runoff treatment system that significantly reduces the frequency with which compost beds must be replaced in order to conserve limited financial resources. However, excessively large beds, to allow for decreasing infiltration capacity over time, are also not favored due to their higher initial capital cost. Thus, a desirable replacement medium for the compost beds should have high initial infiltration capacity, and maintain a significant proportion of this infiltration capacity for a long period of time, preferably a period of several years, that constitutes its useful life.

SUMMARY OF THE INVENTION

The invention provides a composition and method that is effective for removing pollutants from storm water runoff. The composition is in pellet-form, and storm water readily flows through a bed of such pellets, i.e., the bed has a useful initial infiltration capacity to storm water runoff and this capacity can be substantially regenerated through simple maintenance. The bed also retains its capacity to remove pollutants from storm water for a period of at least about 3 to about 4 years.

The pelletized composition of the invention includes mature deciduous leaf compost, and is dried to a moisture content of less than about 15 wt. % based on the dry weight of the compost. Surprisingly, the pelletized compost, optionally including a core of gravel, resists crushing, and is able to withstand a crush force of at least about 7 lbs. without structural failure. When immersed in water, the pellets of the composition substantially retain their original dry shape, and maintain a proportion of their resistance to crush forces. The interstitial spaces between pellets in the bed provide a flow path for storm water. As a consequence of the pelletized shape of the composition, and the interstitial spaces created between the pellets, a bed of the pellets is able to maintain a useful infiltration capacity, even after storm water has deposited some sediment in the bed.

The invention also provides a method of treating storm water runoff that includes passing the storm water runoff through a bed of spherical-shaped pellets. The bed of pellets is sufficiently thick to significantly reduce the concentration of the pollutants in the runoff.

In addition, the invention provides a method of pelletizing compost so that the pellets may be used in the treatment of storm water runoff. The method includes preparing aged deciduous leaf compost by aerobically composting deciduous leaves. This aged compost, known as "mature compost," is then screened to remove particulates greater than about ½ inch. The screened compost is then formed into pellets by mixing with water and optionally added gravel in a rotary drum-type device, such as a concrete mixer. The pellets formed, typically about 90% in the about ⅛ to about ½-inch size range, are then dried to a moisture content of less than about 15 wt. %, based on the dry weight of the compost. It has been found that, when mixed in a rotary drum with gravel, the pelletized compositions of the invention often have a central core of gravel surrounded by a thick layer of compost.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
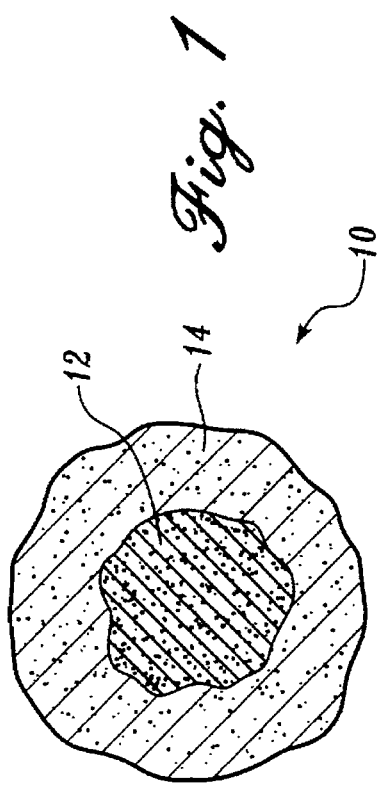
FIG. 1 is a schematic diagram of a cross-section through an embodiment of a spherical-shaped compost pellet of the invention that has a gravel core.

The invention provides a pelletized composition, a method of making the pelletized composition, and a method of using the pelletized composition to treat storm water runoff to reduce the amount of pollutants in the runoff. In order to treat storm water runoff, a bed of the pelletized composition of the invention is formed, of sufficient thickness to remove pollutants from the runoff to a desired level, while at the same time providing a useful rate of flow for runoff through the bed.

The dried pelletized composition of the invention optionally and preferably includes a central core of gravel, crushed rock, or other suitable substitute, surrounded by a hardened layer of mature deciduous leaf compost. The preparation of such compost is disclosed in U.S. Pat. No. 5,322,629, which is hereby fully incorporated by reference. Preferably, the leaves for making the compost are whole, and not run through a vacuum chipper. The leaves are preferably deciduous or mainly deciduous and large proportions of pine needles, chestnut and walnut leaves are undesirable. Foreign matter, such as glass, plastics, metal, etc. are preferably removed. Importantly, the composting process is aerobic, preferably in open windrows about 15 feet across at the base, 8 feet high and 4 feet across at the top. The windrows should be well drained and internal temperatures should be monitored. To avoid anaerobic conditions, the windrows should be turned before temperatures decline from a temperature plateau in the range of 160°–200° F., depending upon the season. This generally produces a suitable mature compost within about 200 to about 270 days, depending upon the internal temperature and drainage of the windrows. Moisture content of the composting leaves should preferably be maintained in the range of 55 to 70 wt. % (based on the wet weight of the material).

The composition of the pellets may be more readily understood when the method of making the pellets is considered. Mature deciduous leaf compost, prepared as described above, is preferred as the primary compost material used for forming the pellets. It has been found that this type of compost is effective in removing pollutants from storm water runoff and leaks little color or nutrients into treated water. To encourage agglomeration of the compost into pellets, larger fibrous material must first be removed from the compost. Thus, the compost is first screened through a ¾×½ inch slot-screen to remove oversized particulates that may interfere with the pelletizing process. When the pelletizing process, described below, is properly controlled, pellets produced do not release excessive amounts of fines when in use that may hinder infiltration capacity. Otherwise, it may be convenient to remove fine material from the compost, by screening over a 20 U.S. mesh screen.

The screened compost, having a consistency like light potting soil and a moisture content of about 70 wt. % (by dry weight), is charged to a storage hopper. From the hopper it is controlledly fed to a cylindrical rotating drum, with a predetermined amount of water and, optionally, a predetermined mount of gravel, crushed stone, or the like. The drum preferably rotates at a rate of about 10–12 rpm when it is a drum of diameter about 42 inches and length about 8 feet, inclined at an angle of about 7°. The particle size is dependent upon all these factors (rotation rate, drum size and angle of inclination) and one of skill in the art can produce pellets within a required size range without undue experimentation by adjusting these parameters. The amount of water charged to the drum is carefully controlled. The quantity of water should be sufficiently high to encourage balling up of the compost into pellets, but should not be excessive because the water must be driven off later to produce a final dried pellet with a water content of less than about 15 wt. %, based on the bone dry weights of the compost and any included gravel. As will be explained later, a low water content is preferred in order to produce pellets with a relatively high crush strength. Preferably, water is added to produce a mixture in the drum that contains about 85 to 125 wt. % water, based on the dry weights of the compost and gravel, if any gravel is present.

In those preferred embodiments, when gravel forms part of the compost pellets, it is preferred that the pellets contain from about 5 to about 80 wt. % gravel, based on the sum of the dry weights of the compost and gravel, more preferably from about 20 to about 50 wt. %. Preferably, the gravel particulates are in the size range less than ¼ inch but greater than about 10 U.S. sieve number. Often, a proportion of gravel is present in the original deciduous leaves that are composted, so that the compost already contains some gravel. This amount of gravel should be taken into account when determining the amount of gravel that should be added to achieve a predetermined gravel content in the pelletized compositions.

The pellets are then charged to a dryer, where they are dried to a moisture content of less than about 15 wt. %, preferably less than 10 wt. %, and most preferably less than about 7 wt. %, based on the dry weight of the compost and gravel, if any gravel is present. The drying of the pellets to this predetermined moisture content is important. It has been found that pellets dried to this water content retain their shape upon immersion in water for long periods of time. Moreover, pellets of such moisture content are able to withstand a crush force of up to about 7 lbs., preferably on average about 10 lbs., without fracture or failure of the structure. The method of measuring this crush strength is explained in Example 1, below. The drying also reduces the tendency of the compost to leak color into the storm water.

Proper control of the pelletizing process preferably produces pellets sized so that 90% are within the size range from about ⅛ in. diameter to about ½ in. diameter. Some pellets produced by the rotating drum may be sized up to 1 in. in diameter, whereas others would be significantly smaller than ⅛ in. The pellets are clearly not completely uniformly spherical so that a "diameter" of a pellet is the "mean diameter" of several different measured "diameters." A cross-sectional view of an embodiment of such a pellet 10 is shown in FIG. 1. This particular embodiment includes a core of gravel 12 surrounded by a layer of compost 14.

As explained above, the pelletized compost-containing compositions of the invention may be formed into beds of pellets for the treatment of storm water runoff to remove pollutants. When formed into beds, the spherical-shaped pellets pack together to form linked interstitial spaces between them that are flow channels for storm water, thereby allowing a useful rate of flow of water through each square foot of bed surface area for flow. For example, in service, as a design minimum, water should flow through the bed at a rate of at least about 2.0 to 2.5 gallons per minute per square foot. Since infiltration capacity decreases with increasing sedimentation, the initial infiltration capacity should be significantly higher, for example, at least 8.0 gallons per minute per square foot and preferably at least about 12 to about 15 gallons per minute per square foot.

Certain storm waters may contain more sediment than others, and a portion of this sediment may be settled out in pre-settling chambers that precede the entry of the runoff onto the pelletized bed. Nevertheless, some sediment will inevitably be carded into the bed over time so that sedimentation, and resultant loss of infiltration capacity, will commence. Since the compositions are in pelletized form, sediment may not blanket the bed causing a precipitous decline in infiltration capacity, but may gradually fill up some of the interstitial spaces, leaving others available for storm water flow. As a result, the effect of sedimentation is not as deleterious on a pelletized compost bed, as on a bed of unpelletized compost, such as disclosed in fully-incorporated U.S. Pat. No. 5,322,629. When sedimentation is well controlled, it is expected that an open pelletized bed of the invention may remain in useful operation, removing pollutants from storm water runoff for at least about one year without significant maintenance, and for at least about three and up to about four or more years with maintenance. The maintenance includes periodic removal of any accumulated top layer of sediment and loosening of the bed, for example, with a pitchfork, to enhance infiltration capacity.

It is preferred that the beds have a thickness of from about 10 inches to about 1.5 ft. Clearly, the thickness of the bed is dependent upon the concentration and type of pollutants expected to be found in the storm water runoff, and also the available head of the water on the bed and its infiltration capacity. Thus, if the runoff is relatively "clean" having only low levels of pollutants that are easier to remove, then the bed may be relatively shallow. On the other hand, runoff that is relatively "dirty" or that contains a pollutant that is hard to remove may be significantly thicker in order to ensure complete removal of the pollutant, or removal to an acceptable level. The higher the available head of water, the thicker the bed may be for a predetermined limit of infiltration capacity.

While the pelletized compost compositions of the invention have relatively high crush strength, it is not recommended that pressure, approximating the pressure exerted by the shoes of a walking adult, be exerted on a bed of the wet pellets in use. Subjection to such pressure may result in compaction of walked-on sections of the bed leading to permanent loss of infiltration capacity in those sections of the bed. Generally, when a bed loses infiltration capacity, the infiltration capacity may be regenerated by scraping off accumulated sediment on top of the bed and by raking, or otherwise disturbing the bed, to dislodge sediment that has become entrapped in interstitial spaces between pellets.

Figure 2:
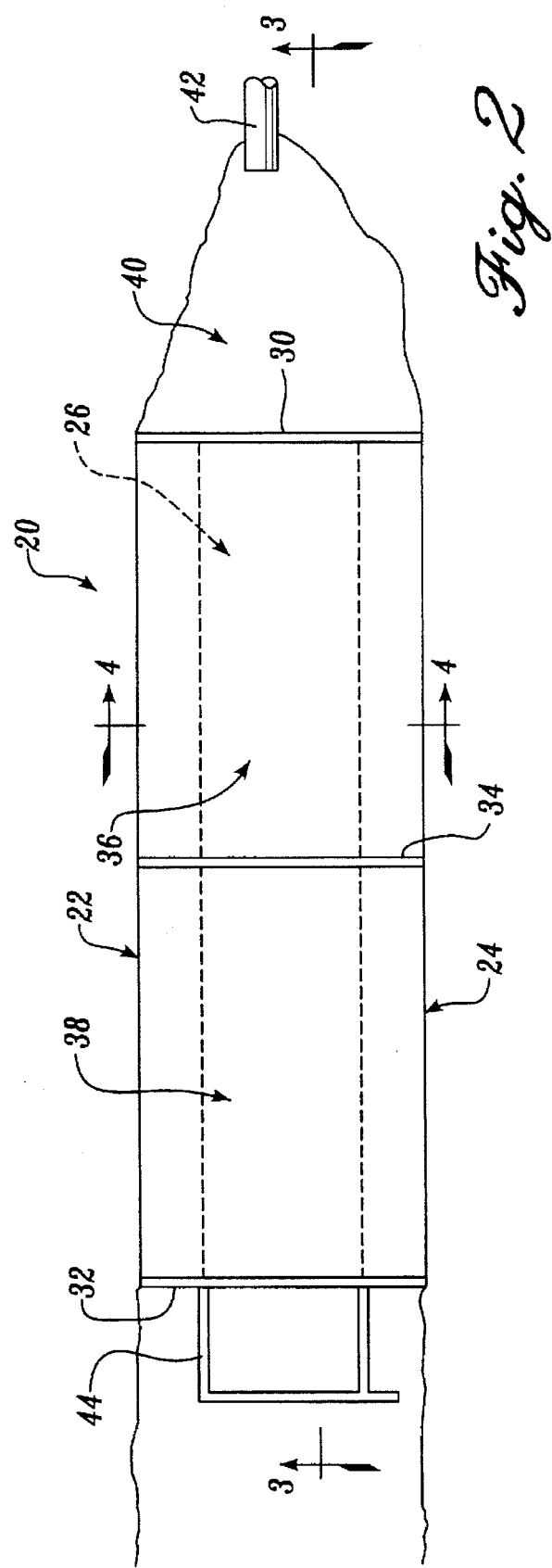
FIG. 2 is a plan schematic view of an illustrative embodiment of a storm water treatment apparatus using the pelletized compositions of the invention.
Figure 3:
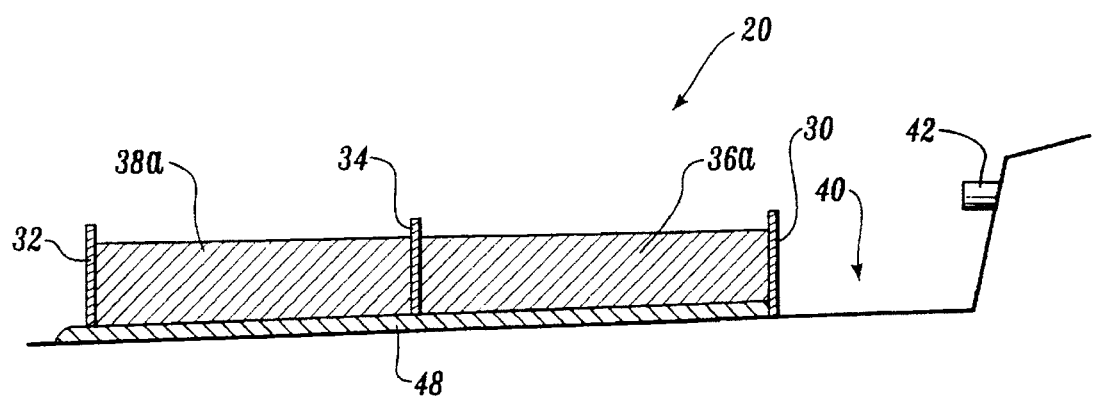
FIG. 3 is a side cross-sectional view of the illustrative storm water treatment apparatus of FIG. 2, taken along line 3—3 of FIG. 2.
Figure 4:
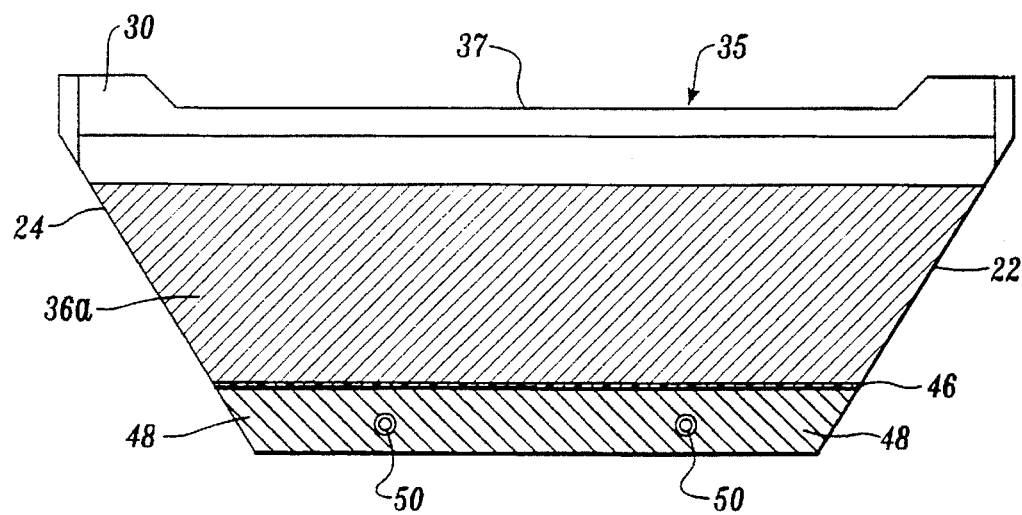
FIG. 4 is an end cross-sectional view of the illustrative storm water treatment apparatus of FIG. 2, taken along the line 4—4 of FIG. 2.

An illustrative storm water treatment apparatus 20, in accordance with the invention, is schematically illustrated in FIGS. 2–4. The apparatus 20 is generally rectangular, as viewed from above, with opposing side walls 22, 24 sloping inwardly and downwardly toward the center to terminate in a flat base 26, as can be seen more deafly in FIG. 4. The embodiment shown has vertical end walls 30, 32 and a vertical dividing wall 34 extending transversely across the center of the apparatus 20 to divide the apparatus into a first compartment 36 and a second compartment 38. Each of these compartments is at least partially filled with pelletized compost to a predetermined height to form two pelletized beds, 36a and 38a, respectively. Advantageously, the apparatus is located in the path of storm water runoff. Thus, a forebay 40 is located upstream of the first end wall 30 of the apparatus, and outside the apparatus, for receiving storm water from the storm water supply pipe 42. At the opposite end of the apparatus 20, is a receiving basin 44 for collecting and conveying away overflow runoff from the apparatus 20.

During operation, water from the storm water supply conduit 42 enters the forebay area 40 where at least a portion of the sediment and solids in the runoff is collected. The water then flows over end wall 30 into the first bed 36a. At least a portion of the water flows downward through the bed and is purified of pollutants through contact with the pellets in the bed. The treated water then flows through a geotextile 46 lining the base 26 of the apparatus. Preferably, the geotextile is of a woven construction having an infiltration capacity of at least about 200 gallons per minute per square foot, and an apparent opening size of at least about U.S. mesh size 20, with a 17% open area. An example of such a geotextile is EROSION™-X style 52047-000 of Synthetic Industries Inc. of Chattanooga, Tenn., or its equivalent. After the water filters through the geotextile, it flows into the drain field 48. The drain field preferably includes a layer of rocks with interstitial spaces into which water can drain from the compost bed. At least one, in this case a pair, of perforated longitudinally extending drain pipes 50 extend along the length of the base of the apparatus to collect treated water and direct the water to a treated water receiving basin 44.

During a storm water runoff event, storm water runoff is discharged into storm water forebay 40 through storm water feed pipe 42. When the forebay fills, excess storm water flows over end wall 30 and into the first compost bed 36a. Due to the infiltration capacity of the bed of pelletized compost, the storm water flows downwardly through the bed, through the material 46 and into drain field 48. If the entry rate of storm water entering compost chamber 36 exceeds the infiltration capacity of the pelletized compost bed 36a, excess storm water builds up in chamber 36, and overflows dividing wall 34 into bed 38a in chamber 38. In a similar manner to that described for bed 36a, the storm water flows downwardly through the bed 38a, through the layer of water permeable material 46 and into drain field 48. If the entry rate of storm water builds up in chamber 38 then it overflows end wall 32 into the excess storm water overflow basin 46. Storm water entering the drain field 48 from the compost beds 36a, 38a is collected by the perforated drain pipes 50 and is discharged from the apparatus 20 as treated effluent.

As shown in FIG. 4, representative wall 30 may be provided with one or more generally "V"-shaped or trapezoidal notch structures 35 on the upper edge 37 of the wall to facilitate uniform distribution of storm water overflowing the wall onto compost in the next receiving compost bed.

The illustrative embodiment shown in FIGS. 2–4, as described above, is particularly suitable for large capacity applications and may, if desired, be constructed directly in the ground with apparatus side walls 22, 24 being formed by the excavated ground. In such applications, a layer of water impermeable material (not shown) is preferably used to line the excavation beneath drain field 48 and the side walls 22, 24 to prevent the storm water from exiting the apparatus, except by flowing through the beds into the drain field or excess water over flow basin.

The method of the invention significantly reduces the concentration of pollutants typically found in storm water, particularly heavy metal ions, oils and greases, and total suspended solids, while not materially affecting the pH of the water. A "significant reduction" depends upon the initial concentration and the degree to which the concentration is reduced towards a target or criterion permissible concentration, whether set by the U.S. Environmental Protection Agency, or by state or local regulation, or by a purchaser of the invention. For example, heavy metal ions are reduced by at least about 90% for most metals, and at least about 80% for total lead, chrome and iron in storm water. Moreover, the method of the invention also removes at least about 70%, preferably about 90% total suspended solids (TSS) from storm water.

The following examples illustrate certain aspects of the invention, and do not limit the scope of the invention as described above and claimed herebelow.

EXAMPLES

Example 1

Method of Crush Testing Pelletized Compost

Figure 5:
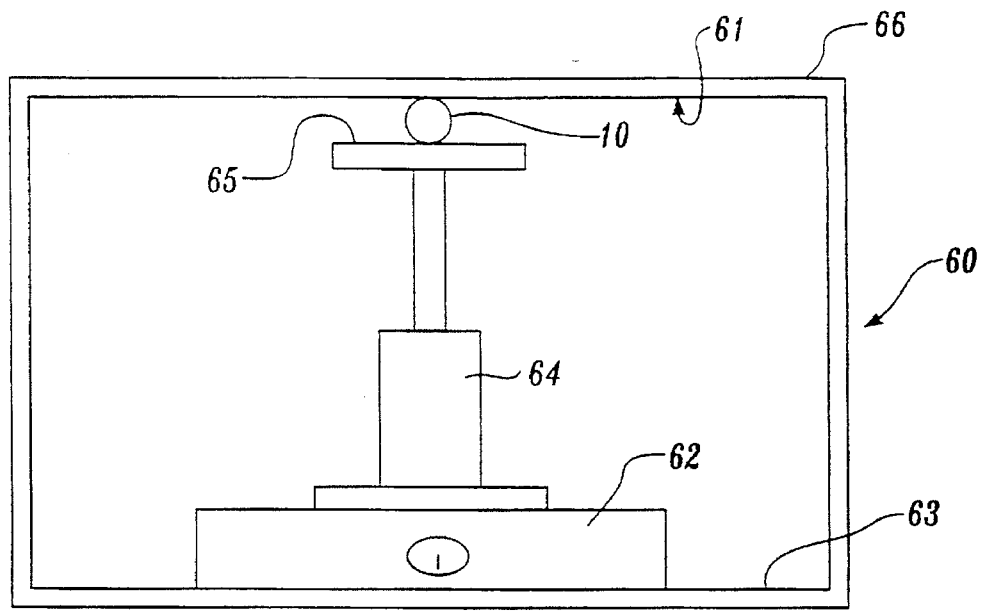
FIG. 5 is a schematic drawing of an apparatus for measuring the crush force applied to a pellet of the invention.

In order to test the crush strength of the spherical-shaped pellets of the invention, the pellets are placed in an apparatus 60 that includes a scale 62 on which is mounted a hydraulic jack 64 that is able to reciprocate until its upper surface contacts an undersurface 61 of a fixed rectangular frame 66, as shown in FIG. 5. Thus, the scale 62 is first placed on the base 63 of the rectangular frame 66, and the jack 64 is placed on the scale. The scale is then reset to read zero. A compost pellet of the invention 10 is placed on the crushing surface 65 of the jack and the jack is raised until the pellet contacts the undersurface 61 of the rectangular frame. Then the jack is slowly raised, while the scale is monitored. The reading on the scale when the pellet begins to crumble is the crush strength of the pellet.

Twenty pellets with average diameters ranging from about 0.6 to about 0.8 inches were crushed using the above-described method. These pellets had a moisture content of about 5.7 wt. %, on a dry weight basis and had a gravel content of about 30 wt. %. The pellets demonstrated significant durability, with a minimum crush strength of about 7 lbs., and a maximum crush strength of about 15 lbs. The average crush strength of the pellets was about 9.7 lbs.

Example 2

In order to determine the effect of moisture content and gravel content on the infiltration capacity of pelletized beds of compost, a series of infiltration capacity tests were conducted. In each case, batches of compost were processed with predetermined amounts of gravel into pellets which were then dried in a forced air dryer. Batches of partially wet pellets were removed after about 1–1.5 days of drying, and later also batches of completely dry pellets.

Infiltration capacity tests were conducted on a standard column using a recycle system to return effluent water from the bed back to a storage vessel to recycle through the pelletized bed continuously. The standard rectangular test column had a square cross-section with sides 1 foot long to provide a 1 square foot area for flow. The pellet bed was supported in the column so that water would drain from it into a receiving basin beneath. The column was sequentially filled to an 18-inch height with pellets from each batch to form a bed. During operation, a static head of water, 10.5 to 12 inches high, was maintained on top of the bed. The infiltration rate of each bed was measured after 2 hours and recorded. The results were as follows:

TABLE 1

| wt. % moisture | wt. % gravel | Infiltration capacity (gpm/ft²) |
|---|---|---|
| 7 | 66 | 6.67 |
| 5.2 | 65 | 8.33 |
| 11 | 50 | 12.67 |
| 62 | 52 | 4.50 |
| 3.6 | 52 | 10.67 |
| 60 | 30 | 3.67. |
| 21 | 46 | 16.50 |
| 3 | 30 | 15.50 |

The results indicate that there is not a good relationship between flow through the bed (infiltration capacity) and moisture content when the moisture content is in the range from about 3 to about 21 wt. %. However, when the moisture content is high, greater than 60 wt. %, the permeability is less than when the moisture content is in the range from about 3 to about 21 wt. %. Moreover, although the moister material had good structure, the strength of the material was relatively lower. The results also indicate that adding more gravel is not necessarily better. The highest infiltration capacities were achieved using pellets with the lowest gravel content. It is believed that the high infiltration capacity achieved for the pellets made without gravel is suspect because the pellets were large (up to softball size) and an excessive amount of water was added to process the compost into pellets. Based on the results, it appears that a gravel content in the range 45 to about 50 wt. %, based on the dry weight of the gravel and compost, provides best results. Moreover, the pellets should also have a low moisture content, less than about 15 wt. %, based on the dry weight of the compost and the gravel.

Example 3

Further tests were conducted to more particularly identify the gravel and moisture contents of pellets that provide optimum flow properties, initial and ultimate permeability, when the pellets are packed in a bed. As in Example 2, samples of pellets having different moisture and gravel contents were prepared from mature deciduous leaf compost and gravel. The pellets were packed into a standard column, described in Example 2, to a bed depth of 18 inches. A static head of about 12 inches of water was maintained above the bed to provide a driving force for flow. The infiltration capacity of each bed of pellets was measured after two hours of water flow through the bed. The results are shown in Tables 2A and 2B, below.

TABLE 2A

| Range of wt. % moisture | Infiltration capacity (gpm/ft$^2$) |
|---|---|
| 0–15 | 11.1 |
| 15–25 | 13.4 |
| 25–40 | 7.2 |
| 50–70 | 4.1 |
| 70+ | 1.2 |

TABLE 2B

| Vol. % of gravel added | Infiltration capacity (gpm/ft$^2$) |
|---|---|
| 0 | 8.8 |
| 5 | 11.3 |
| 10 | 9.3 |
| 20 | 7.5 |

Based on the results of Table 2A, the optimal moisture content is in the range 0–25 wt. %, based on the dry weight of compost and gravel. This moisture content range also provides a pellet with a durable structure, suitable for transportation. Furthermore, the pellet does not require complete drying, so that a small forced air dryer can achieve this moisture content for a six-inch deep bed of pellets in approximately 36 hours. Drying time may be decreased by using solar heat in conjunction with forced air.

Table 2B suggests that the optimum gravel content is about 5 vol %, i.e., about 45 to about 50 wt. %, based on the sum of the dry weights of gavel and compost in the pellet. However, gravel content does not appear to be critical since it has been observed that flow rates of the order of 7 gpm/ft$^2$, or higher, can be achieved with gravel contents as high as 66 wt. %.

Example 4

Tests were conducted to determine the extent of leaching of nitrogen and phosphorous compounds into water passed through a bed of pelletized compost, in accordance with the invention.

Compost was prepared from deciduous leaves derived from leafy material obtained from the City of Portland composting facility. The compost was first screened to remove fines. Thereafter, the material was processed into pellets containing 30 wt. % gravel, and having a moisture content of about 10 wt. %. The flow rate through an 18-inch thick bed of the material was measured, in a standard column (Example 2) under a 12-inch static head of water, as 14.8 gpm/ft$^2$. Thereafter, leaching tests were conducted on the material.

A volume of tap water was passed through an 18-inch thick bed of the pellets in a 6-inch diameter tube. After 10 gallons had flown through the bed, at a rate of 2 gallons per minute, the effluent from the bed was sampled and analyzed for pH, total suspended solids (TSS), soluble phosphorous, total phosphorous, bio-available phosphorous, total Kjeldahl nitrogen (TKN), and nitrate/nitrite. The results are shown in Table 3A.

TABLE 3A

| Analyte | Influent (mg/l) | Effluent (mg/l) |
|---|---|---|
| pH | 7.6 | 7.8 |
| TSS | — | 7 |
| P (soluble) | — | — |
| P (total) | — | 0.38 |
| P (biological) | — | 0.31 |
| TKN | — | 1.7 |
| NO$_3$/NO$_2$ | 0.54 | 13 |

The results indicate an insubstantial increase in pH that may be due to instrument error. The increase in TSS is expected for a fresh bed of compost as fines initially leach from the bed. Over a period of time this diminishes until there is no measurable increase. The increased phosphorous and nitrogen levels of the effluent are also expected to decrease as more water flows through the bed.

A solution containing heavy metal ions, including cadmium, chromium, copper, iron, lead and zinc was prepared. This solution was passed through the 18-inch thick pelletized bed in the 6-inch column, and the effluent was sampled and analyzed. The flow rate through the bed was about 2 gpm/ft$^2$. The results are shown in Table 3B.

TABLE 3B

| | Total (mg/l) | | | Dissolved (mg/l) | | |
|---|---|---|---|---|---|---|
| Analyte | Influent | Effluent | % Removed | Influent | Effluent | % Removed |
| Cd | 0.059 | — | 100.0 | 0.063 | 0.004 | 93.7 |
| Cr | 0.12 | 0.016 | 86.7 | 0.11 | 0.008 | 92.7 |
| Cu | 1.9 | 0.047 | 97.5 | 1.9 | 0.022 | 98.8 |
| Fe | 4.7 | 0.48 | 89.8 | 4 | 0.08 | 98.0 |
| Pb | 0.13 | 0.02 | 84.6 | 0.08 | — | 100.0 |
| Zn | 4.7 | 0.099 | 97.9 | 4.5 | 0.06 | 98.7 |

The results indicate that removal rates were excellent for each of the metals—removal rates exceeded 90% for most metals, and exceeded 80% for total influent chrome, iron and lead.

Example 5

The infiltration capacity of compost beds of the invention prepared from pelletized compost was compared with unpelletized compost beds. The vertical scale shows the infiltration capacity in gallons per minute per square foot.

Figure 6:
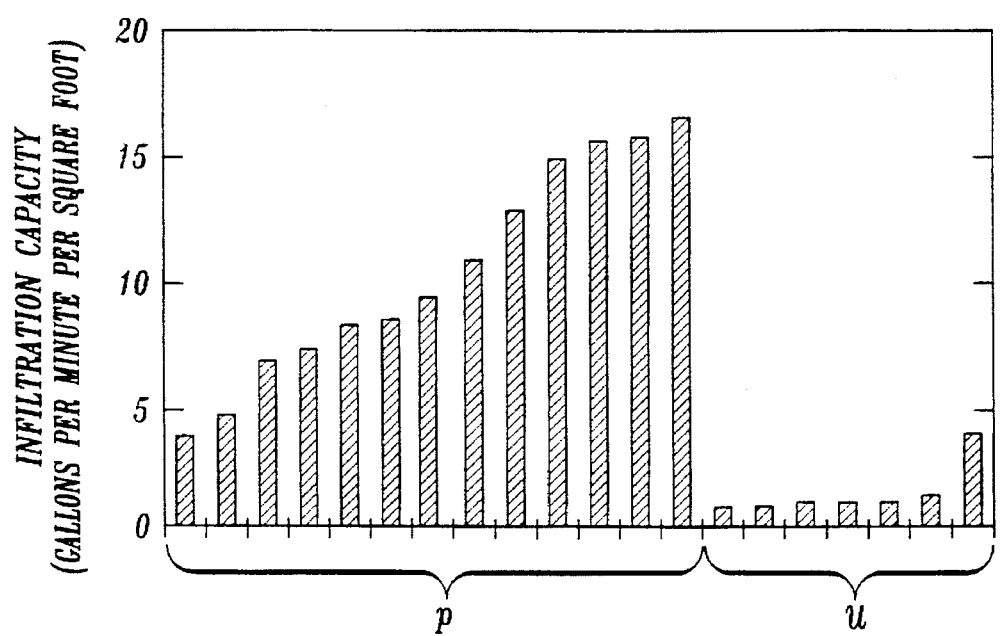
FIG. 6 is a bar graph showing flow rates, in gallons per minute per square foot, through various pelletized beds of the invention as compared to unpelletized beds.

Data from a variety of prior-tested batches of pelletized and unpelletized compost were compiled and their infiltration rates were compared. The results are graphically illustrated in FIG. 6, a bar graph illustrating the superior flow rates achieved through the pelletized beds (P), as compared to the unpelletized (U) beds.

Example 6

Tests were conducted to determine whether there is a significant difference between pelletized and unpelletized leaf compost with respect to the percentage removal of metal ions from water. In both the pelletized and unpelletized beds, the leaf compost was City of Portland compost. In each case, the beds were 18 inches deep and were packed in six-inch diameter cylindrical columns. The unpelletized compost was moist, and had a loose potting soil-like texture. The pelletized material was dry, with a granular structure of round-shaped particles, the majority of which were in the size range 1/8-1/2 inch diameter.

Figure 7:
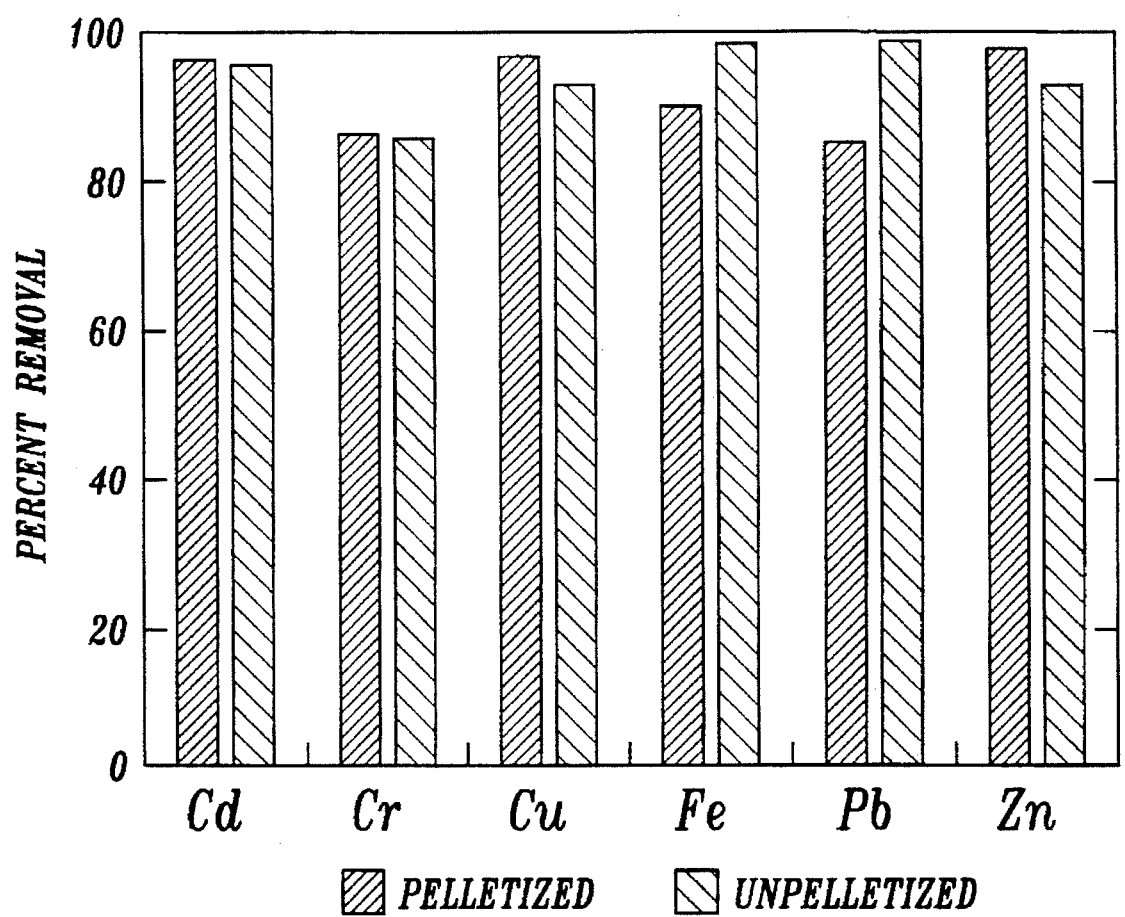
FIG. 7 is a bar graph illustrating the percentage removal of metal ions from storm water, using a bed of pelletized compost versus unpelletized compost.

Solutions containing heavy metals were prepared and analyzed. These solutions were then passed through the compost beds and the effluent was sampled after five gallons had passed through the beds. The samples were analyzed, and the results are illustrated graphically in FIG. 7, showing removal rates for pelletized material and unpelletized material.

Due to the pelletized nature of the bed of the invention, the infiltration rate through the bed was about six times higher than the rate through the unpelletized compost. Nevertheless, as can be seen from FIG. 7, the metal ion removal of the pelletized bed compares very favorably with that of the unpelletized bed. Indeed, there is no statistically significant difference in the percentage removal.

The advantage of the invention becomes apparent when it is considered that the unpelletized material will become clogged with sediment much sooner than the pelletized compost, thereby causing untreated storm water to overflow the beds and bypass the treatment system. The pelletized compost will consequently treat more storm water, on an annual basis, and prevent a larger proportion of the influent metal ions from bypassing the compost beds and entering receiving water bodies.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of treating storm water runoff to reduce the amount of pollutants in the storm water, the method comprising passing the storm water runoff through a bed of pellets, the bed of pellets sufficiently thick to significantly reduce a concentration of at least one contaminant present in the storm water, the pellets comprising mature deciduous leaf compost and gravel, the pellets able to withstand a crush force of at least about 7 lbs., before immersion in the storm water.

2. The method of claim 1, wherein the pellets are size-distributed such that 90% are in the range from about 1/8 to about 1/2 inch.

3. The method of claim 1, wherein the pellets have a moisture content of less than about 15 wt % before the step of passing the storm water through the bed of pellets.

4. The method of claim 1, wherein the bed of pellets is supported on geotextile having openings of size at least about 20 U.S. mesh size, the storm water flowing through the geotextile after passing through the bed of pellets.

5. The method of claim 1, wherein the passing of the storm water through the bed removes at least about 80% of a metal ion species from the storm water.

6. The method of claim 1, wherein the passing of the storm water through the bed reduces total suspended solids concentration in the storm water by at least about 90%.

7. The method of claim 1, wherein the passing of the storm water through the bed of pellets is maintained at a rate of at least about 2.5 U.S. gallons per minute per square foot of bed after 3 years.

8. The method of claim 1, wherein the passing of storm water through the bed of pellets is at an initial rate of at least about 8 gallons per minute per square foot.

9. The method of claim 1, wherein the bed of pellets comprises spherical-shaped pellets.

10. A composition for treating storm water runoff, the composition comprising, in pellet form, mature deciduous leaf compost, the pellet comprising less than about 25 wt. % water, based on a dry weight of the compost.

11. The composition of claim 10, wherein the pellet has a core of gravel.

12. The composition of claim 10, wherein the pellet comprises from about 0 to about 70 wt % gravel, based on the sum of the dry weights of the gravel and the compost.

13. The composition of claim 10, wherein the pellet has a crush strength of at least about 7 lb.

14. The composition of claim 10, wherein the moisture content of the pellet is less than about 15 wt %.

15. A method of pelletizing compost for use in the treatment of storm water runoff, the method comprising:

(a) selecting aged deciduous leaf compost prepared by aerobically composting deciduous leaves;

(b) screening the compost to remove particulates greater than about ¾-inch in size;

(c) forming the screened compost into pellets by mixing with water and optionally gravel; and (d) drying the pellets to a moisture content of less than about 25 wt. %, based on the weight of the dry compost.

16. The method of claim 15, wherein the step of forming comprises mixing in a rotating drum inclined at an angle to form pellets.

17. The method of claim 16, wherein the mixing comprises mixing about 85 to about 125 wt % water, based on the sum of the dry weights of the compost and optional gravel.

18. The method of claim 17, wherein the mixing comprises mixing with about 0 to about 70 wt % gravel, based on the sum of the dry weights of compost and gravel.

19. The method of claim 15, wherein the drying comprises drying to a moisture content of less than about 15 wt %.

20. The method of claim 15, wherein the step of drying comprises drying to produce pellets having a crush strength of at least about 7 lbs.

21. The method of claim 15, wherein the forming comprises forming pellets having a size distribution such that 90% are in the range about ⅛ to about ½ inch.

* * * * *